Sept. 3, 1968  KAZUYUKI NISHIMOTO ET AL  3,399,667

COMPOSITE GLASS ELECTRODE

Filed Oct. 18, 1965

INVENTORS
Kazuyuki Nishimoto
Yoshio Iida
BY Wenderoth, Lind and Ponack
ATTORNEYS __3,399,667__
__COMPOSITE GLASS ELECTRODE__
Kazuyuki Nishimoto, Ibaraki-shi, Osaka-fu, and Yoshio Iida, Hirakata-shi, Osaka-fu, Japan, assignors to Matsushita Electric Industrial Co., Ltd., Osaka, Japan
Filed Oct. 18, 1965, Ser. No. 496,896
5 Claims. (Cl. 128—2)

ABSTRACT OF THE DISCLOSURE

A pH sensor comprising a glass container having a bulb of a pH sensitive glass composition and a neck on said bulb of another glass composition, the coefficient of thermal expansion of the neck and the bulk being the same. The neck has at least one small hole therein for an electrical liquid path through the neck. A spacer consisting of a disk having a hollow stem passing through it is mounted in the glass container by being secured to the container along the circumference of the disk. This spacer divides the glass container into a pH sensitive glass electrode and a reference electrode. A first silver chloride electrode is mounted in the pH sensitive glass electrode and a second silver chloride electrode is mounted in the reference electrode. The glass electrode is filled with a buffer solution and the reference electrode contains an electrically conducting solution. The hole in the neck is filled with a porous material and an insulating wafer covers the glass container. Electrical connectors connected to the silver chloride electrodes project through the insulating wafer. The sensor can be joined to an oscillator unit to form a single body which can be used as a radio capsule for measuring pH by telemetry.

---

This invention relates to a novel structure of a pH measuring glass electrode, and more particularly to a radio capsule including a composite glass electrode for use in measuring and transmitting the pH of stomach fluids.

Recent progress in medical techniques has required a small pH sensor which can be swallowed by patients. Such a swallowed pH sensor would enable the physician to measure the pH of stomach fluids continuously by telemetry. An accurate measurement of pH of fluids generally is usually undertaken by using a pH sensor comprising a pH sensitive glass electrode and a reference electrode which are separately assembled. However, a well known pH sensitive glass electrode has a high electrical resistance and is thought to be difficult to make in a small size which may be swallowed easily. Measurement of the pH of stomach fluids by telemetry has been carried out by using an antimony electrode having a low electrical resistance. The antimony electrode, however, has drawbacks, for example its electromotive force is unstable over the measuring time and varies with foreign ions dissolved in the stomach fluids. It is desirable to prepare a small pH sensor characterized by a high stability and a low electrical resistance.

It is an object of this invention to provide a composite glass electrode with a high stability and a low electrical resistance.

It is a further object of this invention to provide a method for preparing a composite glass electrode having desirable characteristics.

The conventional pH measuring electrodes comprise a pH sensitive glass electrode and a reference electrode which are separately assembled. It is difficult to miniaturize the conventional pH sensor comprising such a pH sensitive glass electrode and a reference electrode because a small glass electrode has a small surface area having high electrical resistance, and a small reference electrode requires only a small volume of electrically conducting solution. This invention contemplates a composite glass electrode comprising a pH sensitive glass electrode, a reference electrode and a spacer, all in one body. Said spacer is formed of electrically insulating and water-tight materials such as glass or resin.

The novel composite glass electrode comprises a pH sensitive glass container and a reference electrode in the container. Said glass container is composed of a glass bulb consisting of pH sensitive glass compositions such as lithium silicate, and a neck consisting of another composition having high electrical resistance and the same coefficient of thermal expansion as that of said glass bulb. Said neck has one or two holes for a liquid junction. Said spacer may be formed of glass or resin and is inserted into the aforesaid glass container to divide said glass container into a pH sensitive glass electrode and a reference electrode. The pH sensitive glass electrode so produced is filled with a buffer solution which includes an aqueous solution of potassium chloride, and provided with an internal electrode which may be a per se well known silver chloride electrode or a calomel electrode. The reference electrode is also provided with an internal electrode which may be a silver chloride electrode or a calomel electrode and is filled with an electrically conducting solution such as an aqueous solution of saturated potassium chloride through the holes in the neck. The holes are subsequently closed by a porous material such as cotton, wool or cork. An insulating wafer covers the bottom of the composite glass electrode so produced and has electric connectors for the lead wires from the internal electrodes.

More details of this invention will become apparent upon consideration of the following description taken together with the accompanying drawings in which.

Figure 1:
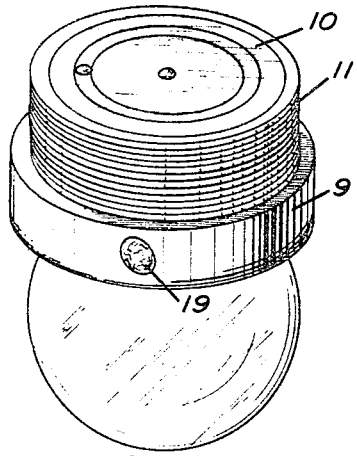
FIG. 1 is a perspective elevation view of a composite glass electrode according to this invention.
Figure 2:
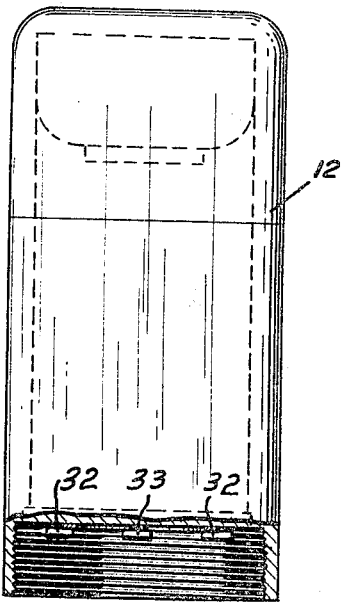
FIG. 2 is a cross-sectional view of a glass electrode-type sensor incorporating the composite glass electrode shown in FIG. 1.

Referring to FIGS. 1 and 2, a silver chloride electrode 1 for use by means of a reference electrode is mounted in an annular insulating material 25 in the neck 2 of a glass container 5 having a spacer which consists of a disk 3 with a hollow stem 4 mounted in the neck 2 of the container. A silver chloride electrode 1' for use in a pH sensitive glass electrode is mounted in the outer end of stem 4 of the spacer and is covered by an insulating material 26. A main part of glass container 5 is filled with a buffer solution of pH 7 saturated with potassium chloride to form a pH sensitive glass electrode, and annular space 6 with the silver chloride 1 therein is filled with an electrically conducting solution such as saturated aqueous solution of potassium chloride to form a reference electrode. The wall of the neck 2 of the glass container 5 has two holes 7 and 8 therein to form a liquid conductive path from the reference electrode to the pH sensitive glass electrode through a liquid to be tested. Holes 7 and 8 are closed with a porous material such as cotton, wool or cork. The outer end of the annular reference electrode is covered with a water-tight electrically insulating wafer 10 such as glass or resin. The neck 2 of the glass container 5 is covered by a resin capsule 9 having an exteriorly screw threaded portion 11 for connecting the composite glass electrode with an oscillator unit 12.

Figure 3:
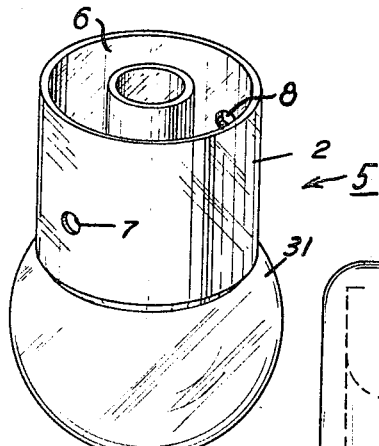
FIG. 3 is a perspective elevation view of a pH sensitive glass container forming part of the electrode illustrated in FIGS. 1 and 2.

Referring to FIG. 3, the glass container 5 comprises a pH sensitive glass bulb 31 made by blowing a small piece of molten glass picked up by a glass tube. The glass tube which forms a neck 2 after being cut is preferably a different composition from that of the pH sensitive glass bulb 31. It is necessary that the coefficient of thermal expansion of the tube be essentially the same as that of the pH sensitive glass bulb 31. Holes 7 and 8 may be prepared by a conventional mechanical technique or by an etching method.

Figure 4:
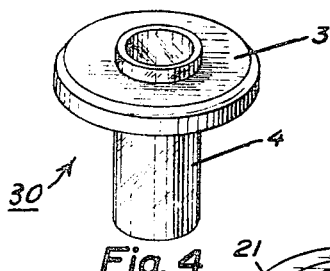
FIG. 4 is a perspective elevation view of a spacer for the glass electrode shown in FIGS. 2 and 3.

Referring to FIG. 4(a), a spacer 30 comprising a disk 3 and a stem 4 shown in an inverted position, can be formed of glass or resin which is an electrically insulating and water-tight material. The disk 3 thereof has a hole in its center into which the stem 4 of glass or resin, which has openings at both ends, is positioned. The outside diameter of the disk 3 is almost the same as the inside diameter of the neck 2 of the glass container 5, and is larger than that of the stem 4. The disk 3 and stem 4 can be combined in the form shown in FIG. 4 by fusing or using an adhesive such as epoxy resin.

It is preferable that an end of stem 4 project downwardly slightly below the disk 3 as shown in FIG. 2, because the projecting stem restricts movement of an air bubble occasionally contained in the glass electrode solution. The air bubble contacts the silver chloride electrode 1' and disturbs the electrical junction between the silver electrode 1' and the glass electrode solution. The disc 3 is tightly inserted in the neck 2 of the glass container 5 and is secured in position by fusing or by using an adhesive such as an epoxy resin. It is necessary that the adhesion be complete so that the electrical insulation is high enough to permit a measurement of an electromotive force between the glass electrode and the reference electrode.

Figures 5A, 5B:
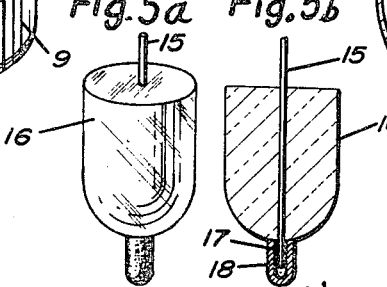
FIG. 5(a) is a perspective elevation view of a silver chloride electrode.
FIG. 5(b) is a sectional elevation view thereof.

Referring to FIGS. 5(a) and 5(b) showing the silver chloride electrode for use in the pH sensitive glass electrode or the reference electrode, a platinum wire 15 is sealed in a glass rod 16 having a diameter such that it fits tightly into a recess in the insulating material 25. One end of the platinum wire is electroplated with silver 17 and is subsequently subjected to chlorination for producing a silver chloride coating 18. A silver wire can be substituted for the platinum wire 15. The well known calomel electrodes can also be used in place of the silver chloride electrodes.

The silver chloride electrode 1' is mounted in the insulating material 26 in the stem 4, which material can be an adhesive, only after filling up the pH sensitive glass bulb 5 with a buffer solution. The silver chloride electrode 1 is also mounted in the annular reference electrode chamber 6 in the same manner.

Figure 6:
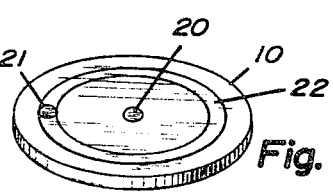
FIG. 6 is a perspective elevation view of an insulating wafer for the electrode shown in FIGS. 1 and 2.

After mounting the silver chloride electrodes 1 and 1', the insulating wafer 10, shown in FIGS. 1 and 2, is added. The wafer 10 is shown in FIG. 6, wherein reference character 20 designates a rivet for connecting a lead from the pH sensitive glass electrode, and 21 is a metal rivet for connecting a lead wire from the reference electrode. The rivet 21 is mounted in a metal ring 22 embedded in the wafer 10 for use in making a connection to the oscillator unit 12. The wafer 10 is applied to the glass container 5 by using an adhesive such as epoxy resin which is waterproof.

The annular reference electrode chamber 6 is filled with a saturated potassium chloride solution having a small amount of free solid potassium chloride, the solution being supplied through holes 7 and 8 in the neck 2 into the annular space 6 of the reference electrode as shown in FIG. 2. The holes 7 and 8 are finally closed with a porous material such as cotton, wool or cork 19 as shown in FIGS. 1 and 2.

The reference electrode is thus made up of the neck 2, the silver chloride electrode 1 and the solution in annular space 6, while the pH sensitive glass electrode is made up of the pH sensitive glass bulb 31, silver chloride electrode 1' and the solution in bulb 5.

Figure 7:
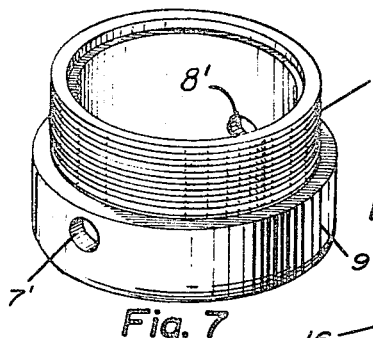
FIG. 7 is a perspective elevation view of a resin capsule having an external threaded portion and holes for liquid connections to the reference electrode.

It is necessary that the composite glass electrode for use in measuring the pH of a solution be combined with an oscillator unit comprising numerous expensive parts such as a miniature mercury battery, transistors, and a variable capacitance diode so that the pH data can be transmitted without wires leading from the unit. Therefore, it is desirable that the composite glass electrode unit be easily detachable from the oscillator unit so that the oscillator unit can be used over and over again. Referring to FIG. 1, the neck of the composite glass electrode is embedded in a resin capsule 9. Details of the capsule are illustrated in FIG. 7, wherein the capsule 9 is shown as having a fine exterior threaded portion 11 for connecting said composite glass electrode to an oscillator unit 12, and as having holes 7' and 8' for the liquid path to the annular space 6 of the reference electrode. The capsule 9 can be made of resin such as Teflon. The holes 7' and 8' in the capsule should have a larger diameter than that of holes 7 and 8 in the neck 2 of the glass container 5. The smaller diameter of the holes 7 and 8 in the neck of the glass container 5 prevent the stopper of cotton, wool or cork from entering the annular space 6.

The ends of the lead wires 15 from the silver electrodes 1 and 1' are connected to small rivets 20 and 21 fixed on the wafer 10 illustrated in FIG. 6. The small rivet 20 and the metal ring 22 contact with connecting terminal 33 in the form of a rivet and a connecting terminal in the form of a metal ring in the oscillator unit when a composite glass electrode is threaded onto the oscillator unit 12. A composite glass electrode which has deteriorated can be replaced by a new composite glass electrode.

A specific embodiment of this invention is illustrated by the following example.

A per se known pH sensitive glass composition consisting of silica, lithium oxide, barium oxide and other metal oxide is melted at 1100° C. and a small amount of the molten glass is picked up by a glass tube of 6.9 mm. outside diameter and 5.9 mm. inside diameter. The composition of said glass tube is controlled so that it has the same coefficient of thermal expansion as that of said molten glass composition. The molten glass is blown into a small bulb with a diameter of 5.0 mm. to 8.0 mm. Since the temperature coefficient of the glass tube and the molten glass are the same, the bulb is secured firmly to the glass tube after cooling. The glass tube is cut at a distance of 5.0 mm. from the joint between the tube and the bulb to provide a neck, and holes 7 and 8 having a diameter of 1.0 mm. are formed in the neck by a well known etching technique.

A spacer 30 having a shape as shown in FIG. 4 is prepared from a disk 5.8 mm. in diameter and a stem 2.6 mm. in outside diameter and 2.0 mm. in inside diameter. The disk and stem are made of glass and secured to each other by an epoxy adhesive. The longer end of the stem is 4.0 mm. from the disk to its end, and the short end projects below the disk 0.7 mm.

The spacer is secured in the neck of the aforesaid glass bulb by using an epoxy adhesive.

A platinum wire having a diameter of 0.2 mm. is sealed into a glass rod with a diameter of 2.0 mm. by a well known glass technique. One end of the platinum wire is cut at a distance of 1.0 mm. from the glass rod, electroplated with silver to a thickness of 0.8 mm. and is immersed in a hydrochloric acid for producing a silver chloride electrode by electrolysis. The silver chloride electrode is mounted in the stem of the spacer by an epoxy adhesive after the pH sensitive glass bulb is filled with a buffer solution saturated with potassium chloride. Another silver chloride electrode is also secured in the annular space 6 to serve as a reference electrode in a manner shown in FIG. 2 by using an epoxy resin.

The end of the neck of glass container is covered with an insulating wafer having two small rivets therein by using an epoxy adhesive. The platinum wires of the silver chloride electrodes are connected to the rivets through the mounting adhesive of the silver chloride electrodes. The neck of the glass container is covered by a resin capsule having a fine exterior screw thread and holes 7' and 8'. The holes are aligned with the holes in the neck of the glass container for use in forming an electrical conduction path. A saturated potassium chloride solution is put into the annular reference electrode chamber through the holes, and then they are filled with a porous cork.

The composite glass electrode so produced is connected to an oscillator unit having a transistor, variable capacitance diode and mercury battery. The glass electrode together with the oscillator unit is 27.0 mm. long and 9.5 mm. in diameter and has an electrical resistance of 1.5 M$\Omega$ and an electromotive force of 58.6 mv./pH at room temperature.

Changes may be made within the scope and spirit of the appended claims which define what is believed to be new and desired to have protected by Letters Patent.

What is claimed is:

1. A pH sensor comprising a glass container having a bulb of a pH sensitive glass composition and a neck on said bulb of another glass composition with the same coefficient of thermal expansion as that of said bulb, said neck having at least one small hole therein for an electrical liquid path through said neck, a spacer comprised of a disk having a hollow stem thereon having a diameter smaller than that of said disk and extending through said disk, said spacer being mounted in said glass container by being secured to the container along the circumference of said disk and positioned in said glass container between said neck and said bulb to divide said glass container into a pH sensitive glass electrode within said stem and said bulb and a reference electrode around said neck within said stem, a buffer solution filling said glass electrode, a first silver chloride electrode mounted in said pH sensitive glass electrode, a second silver chloride electrode in said reference electrode and an electrically conducting solution in said reference electrode, a porous material in said hole, and an insulating wafer covering said glass container and having electric connectors therethrough connected to said silver chloride electrodes.

2. A spacer as claimed in claim 1 wherein one end of said spacer stem projects slightly beyond the disk.

3. A pH sensor as claimed in claim 1, and a resin capsule around the neck of said glass container, said resin capsule having at least one hole aligned with said hole in said neck, and an exteriorly threaded portion for connecting the composite glass electrode oscillator unit for telemetry.

4. A pH sensor as claimed in claim 3, wherein the hole in the resin capsule has a diameter larger than that of the hole in the neck of the glass container.

5. A radio capsule for measuring pH by telemetery, comprising a pH sensor and an oscillator unit in one body, said pH sensor comprising a glass container having a bulb of a pH sensitive glass composition and a neck on said bulb of another glass composition with the same coefficient of thermal expansion as that of said bulb, said neck having at least one small hole therein for an electrical liquid path through said neck, a spacer of an insulating material positioned in said glass container between said neck and said bulb to divide said glass container into a pH sensitive glass electrode and a reference electrode, a buffer solution filling said pH sensitive glass electrode, a first silver chloride electrode mounted in said pH sensitive glass electrode, a second silver chloride electrode in said reference electrode and an electrically conducting solution in said reference electrode, a porous material in said hole and an insulating wafer covering said glass container and having electric connectors therethrough connected to said silver chloride electrodes, said electric connectors electrically connecting said pH sensor and said oscillator unit.

References Cited

UNITED STATES PATENTS

| 2,755,243 | 7/1956 | Beckman et al. | 204—195 |
| 3,070,540 | 12/1962 | James et al. | 204—195 |
| 3,103,480 | 9/1963 | Watanabe et al. | 204—195 |
| 3,133,537 | 5/1964 | Muth | 128—2 |
| 3,145,157 | 8/1964 | Arthur et al. | 204—195 |
| 3,340,866 | 9/1967 | Noller | 128—2 |

OTHER REFERENCES

Storer, E. H., et al.: J.A.M.A., Nov. 25, 1961, vol. 178, No. 8, (pp. 830–831).

Jacobson, B. et al.: The Lancet, June 15, 1957 (p. 1224).

RICHARD A. GAUDET, *Primary Examiner.*

K. L. HOWELL, *Assistant Examiner.*